March 30, 1948.  G. F. HODSON  2,438,666
CONVEYOR EGG WASHING AND DRYING MACHINE
Filed July 5, 1946  4 Sheets-Sheet 1
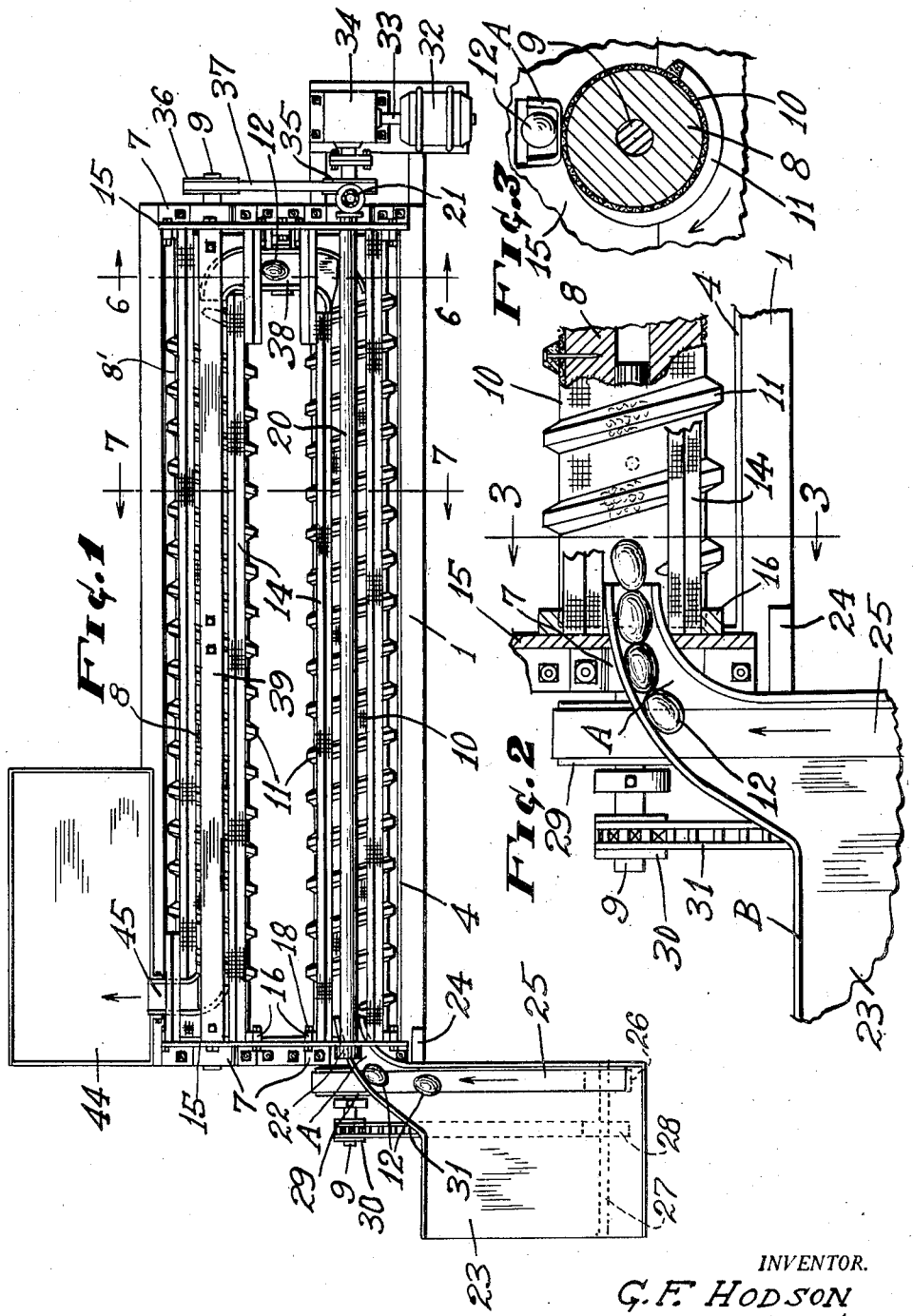
INVENTOR.
G. F. HODSON March 30, 1948. G. F. HODSON 2,438,666
CONVEYOR EGG WASHING AND DRYING MACHINE
Filed July 5, 1946 4 Sheets-Sheet 2
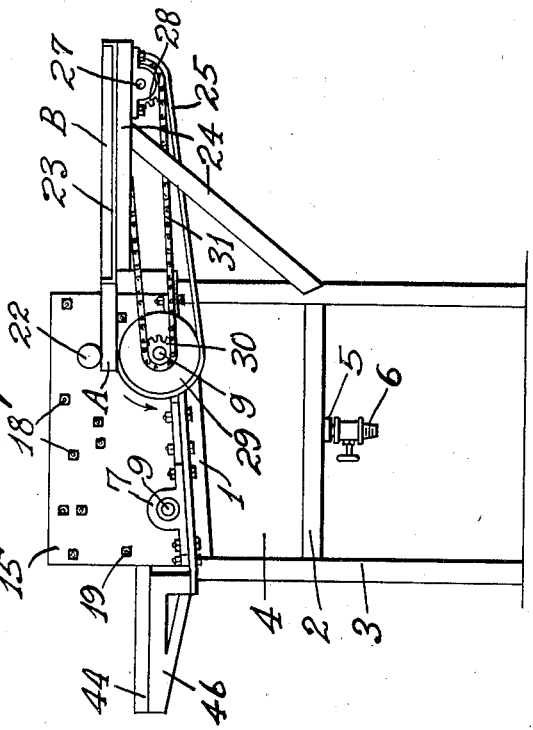
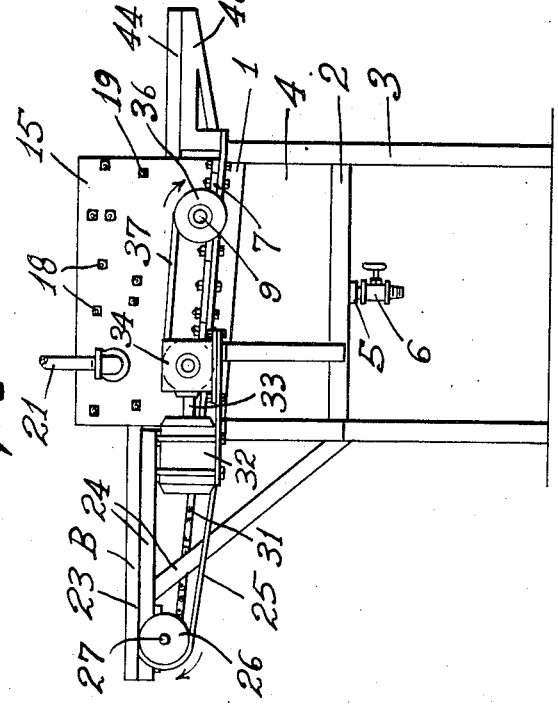
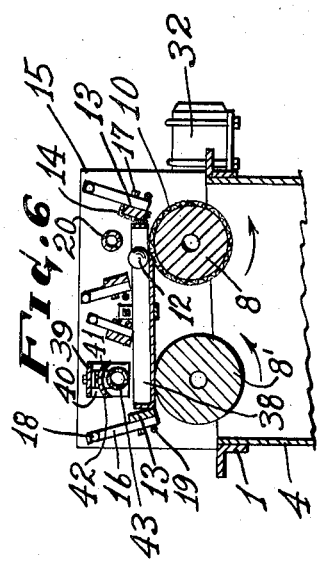
INVENTOR.
G. F. HODSON
BY March 30, 1948.   G. F. HODSON   2,438,666
CONVEYOR EGG WASHING AND DRYING MACHINE
Filed July 5, 1946   4 Sheets-Sheet 3
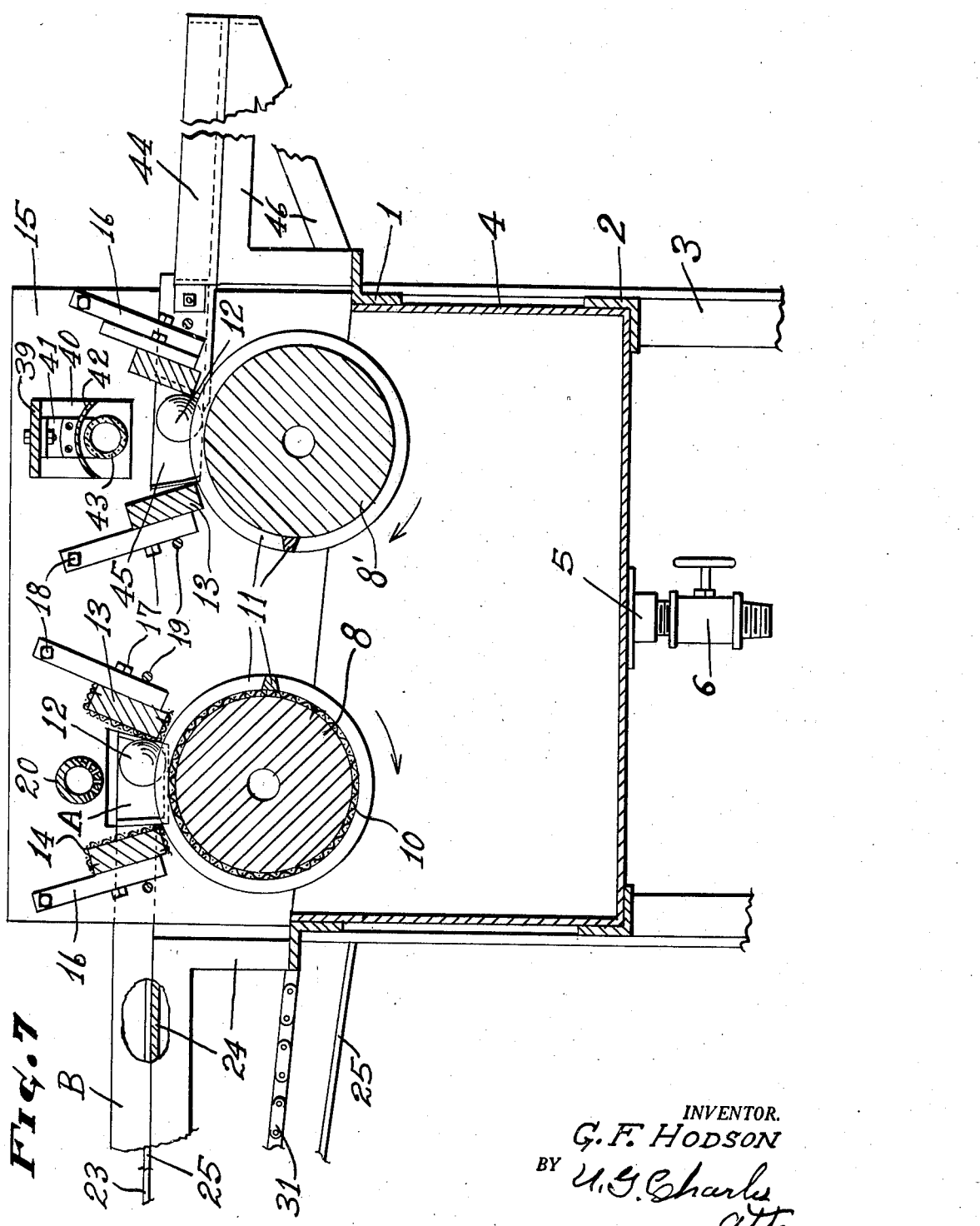
INVENTOR.
G. F. HODSON
BY U. G. Charles
atty.

March 30, 1948.    G. F. HODSON    2,438,666
CONVEYOR EGG WASHING AND DRYING MACHINE
Filed July 5, 1946    4 Sheets-Sheet 4
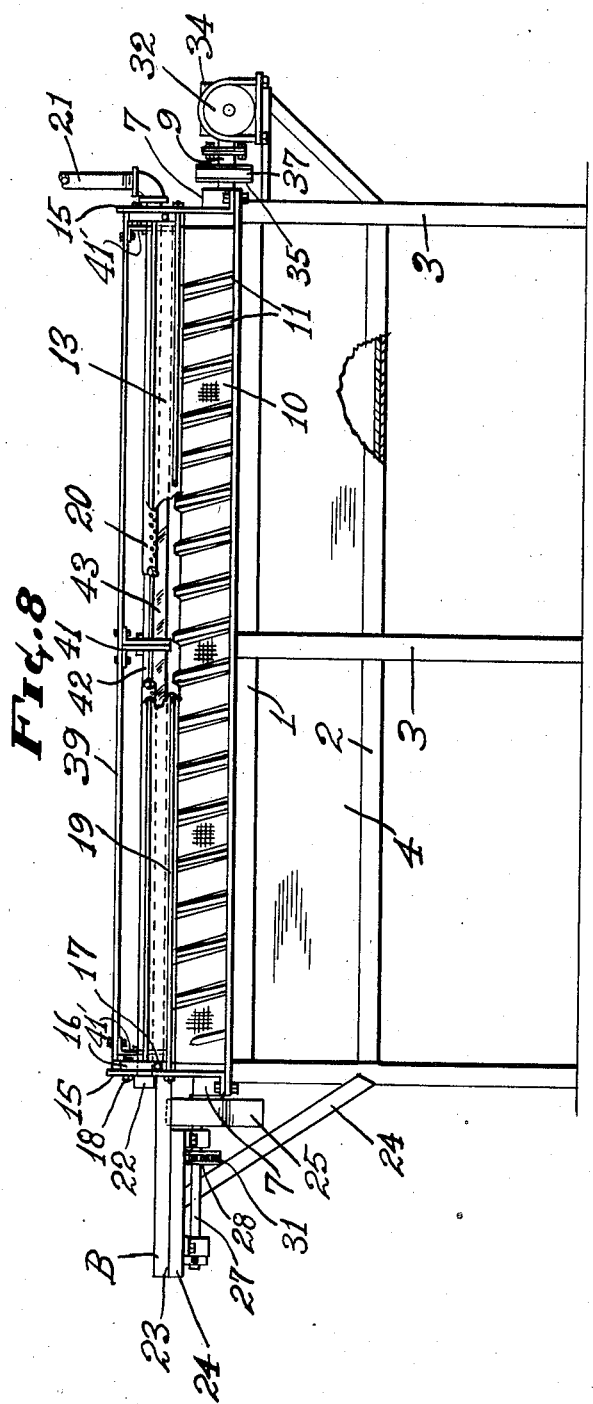
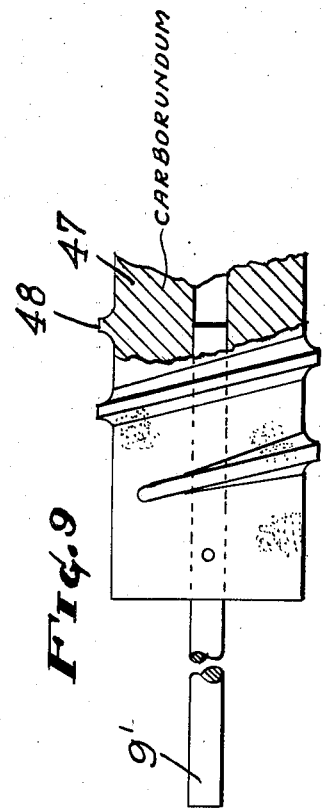
INVENTOR.
G. F. HODSON Patented Mar. 30, 1948

2,438,666

UNITED STATES PATENT OFFICE 2,438,666

CONVEYOR EGG WASHING AND DRYING MACHINE

George F. Hodson, Altus, Okla.

Application July 5, 1946, Serial No. 681,562

1 Claim. (Cl. 15—3.13)

This invention relates to an egg cleanser, and has for one of its objects, a plurality of conveyors, one of which is for cleansing the eggs by abrasive and spraying means to reinstate the natural appearance of the eggs, while another conveyor is to further move the eggs through a period of time sufficient for the eggs to dry.

A further object of this invention is to provide conveyors, the peripheral body of which is covered with closely fitting woven wire commercially known as screening, and the conveyors, having wound on their peripheral surfaces, conveying vanes provided with abrasive surfaces of a comparatively fine texture to produce a matt finish for the shell of the egg.

A still further object of this invention is to construct a machine that will convey eggs through its treating process without causing congestion, or piling up of the eggs in their course of travel.

A still further object of this invention is to provide conductors for the eggs, said conductors being in parallelism and in alignment with the vertical axis of the conveyors to function as a distributor along which the eggs are conducted by the vanes of the conveyor therebeneath, and furthermore, directly over which is positioned a spray pipe extending and spraying continuously the row of eggs from their starting point to the exit, and having means to transfer the eggs from conveyor to conveyor for opposite movement, in their consecutive order.

A still further object of this invention is to construct a machine that will continuously roll the eggs along their path of travel from their entrance point to an exit for the eggs, whereby the shell of the eggs is completely treated circumferentially.

A still further object of this invention is to construct a machine in such a way as to continuously dispose the water after its application to the eggs.

These and other objects will hereinafter be more fully explained, reference being had to the accompanying drawings forming a part of this specification, and in which like characters will apply to like parts in the different views.

Referring to the drawings:

Fig. 1 is a plan view of the machine.

Fig. 2 is an enlarged fragmentary view at the intake end of the machine.

Fig. 3 is a sectional view taken on line 3—3 in Fig. 2.

Fig. 4 is an end elevation of the machine opposite to that of its intake end, while Fig. 5 is a view at the intake end.

Fig. 6 is a sectional view taken on line 6—6 in Fig. 1.

Fig. 7 is an enlarged sectional view taken on line 7—7 in Fig. 1.

Fig. 8 is a front side view of the machine.

Fig. 9 is an enlarged side view of a conveyor as modified.

As a more concise description of the drawings, it will be seen that the same is illustrated as having a pair of conveyors. However, it will be seen in Fig. 7 that a pair of rectangular frames 1 and 2 are positioned on different horizontal planes, and in spaced relation vertically, while frame 1 is positioned with one side slightly on a lower plane than that of the other side for the purpose later described, the lower plane being the rear side of the machine, said frames being carried by legs 3, one pair at each end of the machine, and a pair intermedially disposed, and all being welded to the upper and lower frames.

Positioned within the frames and carried thereby is a tank 4, said tank being open at its upper extremity and having a drain 5 with a cut-off valve 6, the drain being connected to a sewer pipe, or the like, it being understood that the said tank consists of sides, ends and a bottom, the depth of said tank being equal to the vertical spacing of said rectangular frames.

Carried on the ends of frame 1 is a pair of conveyors journalled in bearings 7 mounted on said frame similar to that shown in Fig. 5, said conveyors consisting of cylindrical bodies 8 and 8' of equal length and having spindles 9 journalled in the bearings 7, said spindles preferably being made from steel, or bronze, while the body portions may be formed from wood, fiber, or the like, the cylindrical body 8 to function as a cleanser and being covered from end to end by woven wire 10, hereinafter referred to as screen or screening, that is secured tight-fitting to the body. Spirally wound on the body thus covered is a strip 11, commonly known as V-belting, the sides of which converge outward from the body to function as a conveyor for eggs 12 that are conducted into a bottomless trough-like structure consisting of side walls 13, the confronting portions of which are covered with screening 14, or at least one side thereof, as an abrasive feature for the eggs as conveyed and rolled between the said walls of the trough.

The said side walls are convergent downward and being centered substantially on the turning axis of the conveyor, while the center between the walls is vertically disposed to the turning axis of the conveyor and between said wall the eggs are aligned and guided, starting at the feeding end of the conveyor, said eggs being aligned in consecutive order equal to the spacing of the vanes to avoid contact as conveyed along the trough whereby the eggs are frictionally turned in all directions so that the shell circumferentially is rubbed throughout its surface as carried on the screening and abrasive sides of the vane and screen of the trough.

It will be seen that the side walls of the trough-like structure are supported between end plates 15 that are carried on the ends of the upper frame of the machine, said walls abuttingly engaging with the end plates and being further supported by bars 16 that are secured to the outer sides of the walls 13 by bolts 17 where they meet the plates, said bars at their upper ends being secured to the plates by bolts 18, and the said walls and their respective bars being clamped to snug engagement between the plates by rods 19 extending through the plates.

The cleansing conveyor has a spray pipe 20 extending its full length and being carried by the plates at the vertical turning axis of the conveyor in spaced relation from the eggs, a sector of the pipe being perforated along its lower surface to dispense liquid over the eggs as the same are conveyed from end to end of the conveyor, and a supply 21 for one end of the spray pipe while the other end is closed by a cap 22.

Positioned at the intake end of the machine and extending forward therefrom is an egg receiving table 23 carried by suitable brackets 24 so that the table is positioned on a plane with the upper extremity of the conveyor, said table having a curved portion A and vertically disposed walls B to maintain the eggs therein while the terminal end of the curved portion extends through the end plate 15 to permit passage of the eggs into the trough-like structure where they are taken up by the vanes of the conveyor and moved along the walls of said trough-like structure. It will be understood that the terminal end of the first vane has an end portion feathered inward to meet the body of the conveyor to avoid crushing the eggs where they pass thereover to engage on said conveyor body.

As a means to conduct the eggs to the curved portion, it will be seen that a belt 25 substitutes a strip of the floor of the table and moves toward the conveyor, said belt being carried by a driven pulley 26 that is rigidly mounted on shaft 27 on which a sprocket 28 is secured, while the other end of the belt rides on a pulley 29 that is loosely mounted on the conveyor spindle, said spindle being the driving medium through its sprocket 30 on which a chain 31 is mounted that drives the first said shaft and pulley, that in turn drives the belt; being so arranged the eggs are moved toward the cleansing conveyor on a ratio equal to their movement as conveyed longitudinally of the conveyor to avoid discrepancy or piling up of the eggs where they meet the conveyor. To maintain the belt on a level with the floor of the table the idle pulley is increased in diameter over that of the driving pulley for the belt. The power-actuating means is on the other end of the conveyor 8 that consists of a motor 32, the shaft 33 of which enters a transmission case 34 where the power is transmitted at right angle by suitable gearing to the spindle adjacent thereto, said spindle having a pulley 35 rigidly secured as driving means for another pulley 36 that is secured to the spindle of a sterilizing conveyor 81 and being connected by a belt 37 as turning means for the said conveyor, whereby both conveyors are timed equal in rotation as the eggs from the cleansing conveyor are conducted through a trough 38. The trough 38 is slantingly positioned downward toward the sterilizing conveyor as the latter is on a lower plane than that of the cleansing conveyor, the slant of which is sufficient for gravity actuation, or the eggs may crowd along by vibration of the machine to where they are picked up by the vanes of the sterilizing conveyor and then moved oppositely toward the intake end of the machine.

To sterilize the eggs it will be seen that a bar 39 extends from plate to plate 15, said bar where it meets the plates having a right angle bent portion 40 for its ends to fit snugly and being secured to said plates as shown in Fig. 7. The bar is carrying means for lamp brackets 41 at each end of the bar, and a pair of brackets at the center as carrying means for reflectors 42 under which are also supported by the brackets fluorescent lamps 43 as a sterilizing medium, casting its rays downward over the eggs as conveyed and turned thereunder. In other words, as set up in the drawings, there are two of said lamps aligned and being in parallelism with the conveyor. Furthermore, it will be seen that the eggs are conducted through a similar trough-like arrangement to that provided for the cleansing conveyor and discharged therefrom at the feeding end of the machine onto another table 44 through a suitable curved conductor 45 as shown in Fig. 1 that is likewise supported by suitable brackets 46 as shown in the drawings and from which the eggs are removed and packed in conventional egg containers.

As a modification for the structure of the conveyors, it will be seen in Fig. 9 that the material employed for the body 47 and vanes 48 integrally formed therewith may be Carborundum, or the like, which is an abrasive substitute without additional appliances to accomplish an abrasive feature, and furthermore the Carborundum will not deteriorate or increase its size under the influence of water, however the spindle 9' will remain the same and as easily applied at the time of molding or forming under the use of Carborundum for an integral structure, and such other modifications may be made as lie within the scope of the appended claim.

Having fully described my invention what I claim as new and desire to secure by Letters Patent is:

In an egg cleanser, a pair of conveyors coacting, a frame on which the conveyors are journalled and legs to carry the frame, a table carried by the frame in working relation to one end of one of the conveyors, a belt and pulleys to carry the belt, the belt being on a plane with the table and positioned on its side adjacent the said one end of the conveyor, guiding means carried by the table to conduct eggs across the belt and from thence onto the conveyor, and a trough on the other ends of said conveyors to conduct eggs onto one end of the other conveyor, guiding and aligning means for the eggs carried by the conveyors along their upper sides, a table at the other end of last said conveyor and guiding means to dispense the eggs on last said table, a motor and transmission gears to turn said conveyors and move the belt, a pipe and means to carry the pipe in parallelism with first said conveyor and in spaced relation thereabove, said pipe being apertured along its lower side to dispense water over the eggs as conveyed thereunder, fluorescent lamps of suitable length to extend full length of the last said conveyor, and means to carry the same thereabove and being vertically aligned with the turning axis of said conveyor.

GEORGE F. HODSON.

REFERENCES CITED

The following references are of record in the file of this patent:

UNITED STATES PATENTS

| Number | Name | Date |
|---|---|---|
| 528,195 | Warr | Oct. 30, 1894 |
| 1,530,415 | Roussel | Mar. 17, 1925 |

FOREIGN PATENTS

| Number | Country | Date |
|---|---|---|
| 26,721 | Great Britain | Nov. 17, 1909 |